(12) United States Patent
Menges

(10) Patent No.: US 6,318,895 B1
(45) Date of Patent: Nov. 20, 2001

(54) LINEAR ROLLING BEARING ELEMENT

(75) Inventor: Martin Menges, Homburg (DE)

(73) Assignee: Ina Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/535,918

(22) Filed: Mar. 24, 2000

(30) Foreign Application Priority Data

| Mar. 25, 1999 | (DE) | 199 13 481 |
| May 22, 1999 | (DE) | 199 23 719 |

(51) Int. Cl.⁷ .................................................. F16C 29/06
(52) U.S. Cl. ................................................................ 384/45
(58) Field of Search ................................... 384/45, 44, 43

(56) References Cited

U.S. PATENT DOCUMENTS

| 5,755,516 | * | 5/1998 | Teramachi et al. | 384/45 |
| 5,947,605 | * | 9/1999 | Shirai | 384/45 |
| 5,951,168 | * | 9/1999 | Teramachi et al. | 384/45 |
| 6,045,265 | * | 4/2000 | Shirai et al. | 384/45 |
| 6,085,420 | * | 7/2000 | Konomoto | 384/45 X |
| 6,094,819 | * | 8/2000 | Teramachi et al. | 384/43 X |

FOREIGN PATENT DOCUMENTS

| 31 53 330 C2 | 10/1982 | (DE) . |
| 33 13 129 C2 | 10/1984 | (DE) . |
| 43 31 014 C2 | 3/1995 | (DE) . |
| 0 845 611 A1 | 6/1998 | (EP) . |
| 58-622 A | 5/1983 | (JP) . |

* cited by examiner

*Primary Examiner*—Thomas R. Hannon
(74) *Attorney, Agent, or Firm*—Henry M. Feiereisen

(57) ABSTRACT

A linear rolling bearing element mounted to a running surface of a guide rail, includes a main body which having a rolling-element circuit for guiding the main body along a guide rail via a plurality of rolling elements, with the rolling-element circuit having a load-bearing track and a return track. The main body has opposite ends, each of the ends having formed therein a bay which is accessible through an adjacent end face of the main body. Received in each of the bays of the main body is a deflection member which has formed therein an arcuate passageway for interconnecting the load-bearing track and the return track. Disposed in the load-bearing track, the return track and the arcuate passageways is a guide system of a polymer material, for guiding the rolling elements. The guide system includes a coating which is applied through an injection-molding process in a single working step in the load-bearing track and the return track. A wiper bears directly against the main body at each end face thereof for sealing the adjacent bay to the outside.

5 Claims, 3 Drawing Sheets

LINEAR ROLLING BEARING ELEMENT

CROSS-REFERENCES TO RELATED APPLICATIONS

This application claims the priority of German Patent Applications, Serial Nos. 199 13 481.2, filed Mar. 25, 1999 and 199 23 719.0, filed May 22, 1999, the subject matter of which is incorporated herein by reference.

BACKGROUND OF THE INVENTION

The present invention relates, in general, to a linear rolling bearing element mounted to a running surface of a guide rail.

In typical linear bearings with circulating rolling elements, such as guides with circulating balls, needles or rollers, the region where the rolling elements are deflected is located outside the main body of the bearing element and protected by a separate head piece. During installation, the head piece must be aligned with respect to the main body and secured thereto so as to ensure, e.g., the fluid-tightness of the relubricating device.

German Pat. No. DE 43 31 014 C2 describes a linear rolling bearing element of this type having a main body which includes a rolling-element circuit for guiding the main body along a guide rail via a plurality of rolling elements. The rolling-element circuit is defined by a load-bearing track and a return track which are interconnected at both ends by arcuate passageways which are formed in respective head pieces mounted to the main body. Assembly of the linear rolling bearing element is as follows: First the head piece must be correctly aligned with the main body. This can be done by hand or by a suitable apparatus. Subsequently, the installer has to verify the alignment either by observation or by using a gauge, to ensure a correct fit of the head piece upon the main body. Thus, the assembly is time-consuming, and, moreover, the overall weight of the bearing element is increased as a result of the attachment of separate head pieces onto the end faces of the main body.

SUMMARY OF THE INVENTION

It is thus an object of the present invention to provide an improved linear rolling bearing element, obviating the afore-stated drawbacks.

In particular, it is an object of the present invention to provide an improved linear rolling bearing element, which is easy to assemble and to check, and is cost-efficient as far as installation and storage are concerned.

These objects, and others which will become apparent hereinafter, are attained in accordance with the present invention by providing a main body which includes a rolling-element circuit guiding the main body along a guide rail via a plurality of rolling elements and having a load-bearing track and a return track, wherein each end of the main body has formed therein a bay, which is accessible through an adjacent end face of the main body, for receiving a deflection member which has formed therein an arcuate passageway for interconnecting the load-bearing track and the return track, and by providing a guide system, disposed in the load-bearing track and the return track and made of a polymer material, for guiding the rolling elements, with the guide system including a coating which is applied through an injection-molding process in a single working step in the load-bearing track and the return track.

Through the provision of a linear rolling bearing element according to the present invention, the use of separate head pieces mounted to the end faces of the main body can be eliminated. The bays for the deflection members can be realized through prolongation of the main body, which may be a steel component, and through respective shaping of the main body ends. Through application of injection molding, the deflection zone in the main body for the rolling elements can be formed with plastic material. Thus, the entire rolling-element circuit is now accommodated in the main body, whereby each bay can be sealed from the outside by a wiper which is directly attached to the main body.

According to another feature of the present invention, the wiper includes an inner retainer plate, an outer retainer plate, a sealing strip, a backing plate, and screw fasteners for securing the inner retainer plate, the outer retainer plate, the sealing strip and the backing plate to the main body, whereby the inner plate is positioned immediately adjacent to the main body. In the event of a countersunk arrangement, a flush-mounted configuration of the wiper with the main body can be realized.

According to still another feature of the present invention, the guide system can be so configured that the coating of polymer material for providing the guiding of the load-bearing track and the return track, is prolonged by an extension piece which is disposed at the end of the main body and formed integrally with the coating for circumscribing the bay. In this case, the inner retainer plate of the wiper is supported by a shoulder formed on the extension piece.

A linear rolling bearing element according to the present invention has many advantages compared to conventional designs. Apart from the weight reduction and simplification of assembly, a carriage, mounted to the main body, is better protected against crash, and the fracture strength of the carriage is increased. Moreover, joints, required in prior art devices between the head pieces and the main body, can now be eliminated, so that the bearing element is less likely subject to contamination, and the overall structural strength is improved, while the overall space requirement for the carriage remains unchanged.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
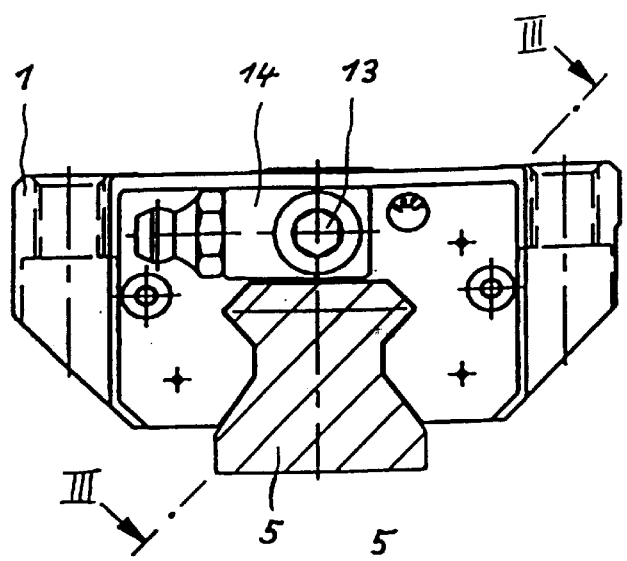
FIG. 1 is a partially sectional end view of a bearing element according to the present invention, mounted to a guide rail for mobility in a longitudinal direction.
Figure 4:
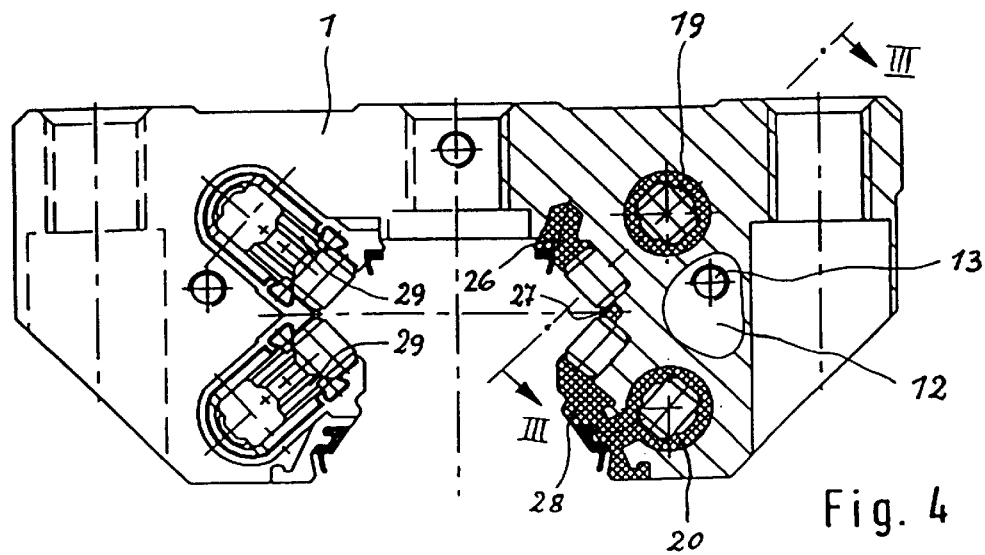
FIG. 4 is a partially sectional end view of the main body of the bearing element.

Turning now to the drawing, and in particular to FIG. 1, there is shown a partially sectional end view of a bearing element according to the present invention, including a carrier or main body 1 which has a generally U-shaped configuration and is mounted on a guide rail 5 for movement in a longitudinal direction. Although not shown in detail, the main body 1 is formed with bores to receive screw fasteners for attachment of a carriage or the like to the main body 1 for linear movement. As shown in particular in combination with FIG. 4, the main body 1 is guided on the guide rail 5 in the area of each side surface by two rolling-element circuits which guide a plurality of rolling elements 4 in the form of cylindrical rollers. Each of the circuits is defined by a rectilinear load-bearing track 18 in which the rolling elements 4 roll on the running surface 7 of the guide rail 5, and a return track 19 which extends in parallel relation to the load-bearing track 18.

Figure 2:
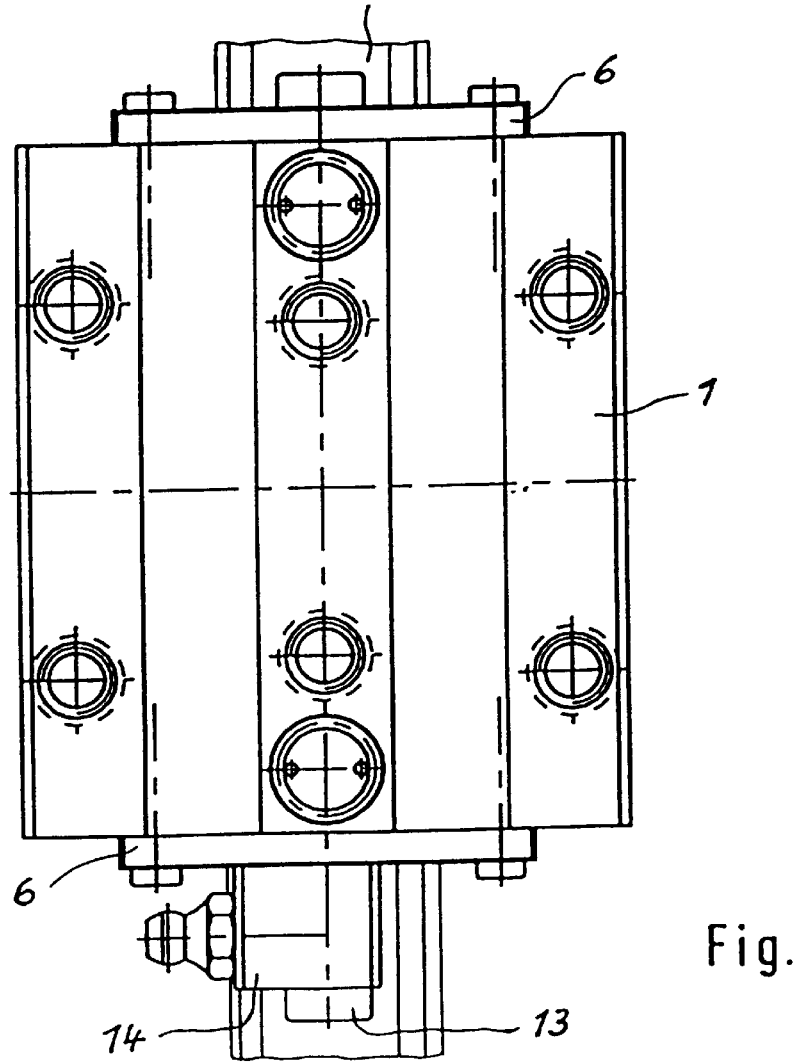
FIG. 2 is a top view of the bearing element of FIG. 1.
Figure 3:
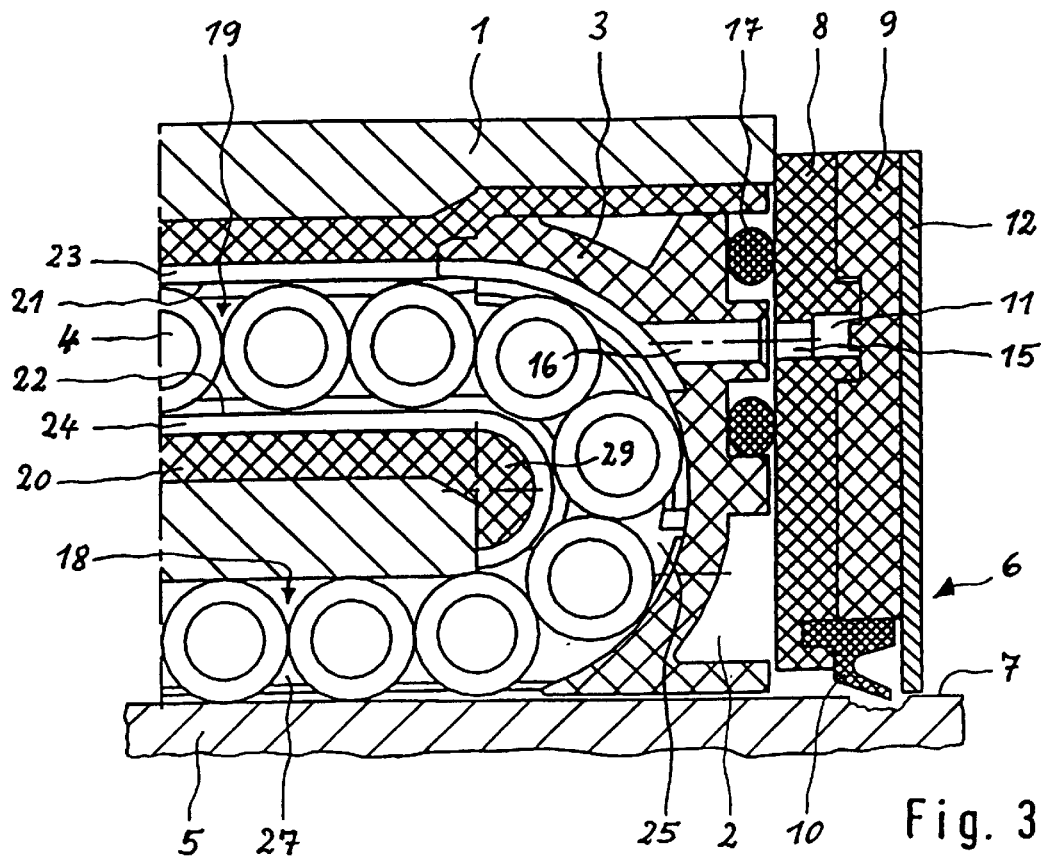
FIG. 3 is a sectional view, on an enlarged scale, of the bearing element, taken along the line III—III in FIGS. 1 and 4.

As best seen in FIG. 3, the main body 1 has opposite ends, with each end accommodating a bay 2 (only one bay is shown in FIG. 3) for receiving a deflection member 3 which has formed therein an arcuate passageway 25 for interconnecting the load-bearing track 18 and the return track 19 at their respective ends. After placement of the deflection members 3 in the respective bays 2, wipers 6 are secured to the end faces of the main body 1 for sealing the bays 2 to the outside, as shown in FIG. 2. The wipers 6 are provided to wipe off contaminations, e.g. metal chips, from the running surface 7 of the guide rail 5, and further realize a sealing of the lubricated interior space of the bearing element. Each wiper 6 includes an inner retainer plate 8, an outer retainer plate 9 and a sealing strip 10 which are all made of a polymer material.

The inner and outer retainer plates 8, 9 of each wiper 6 are formed therein with common lubricant ducts 11 through which lubricant is supplied into the area of the rolling elements 4. Both retainer plates 8, 9 are held in place by a backing plate 12 which is secured to the end face of the main body 1 by screw fasteners 13 (cf. FIGS. 2 and 4). One of the screw fasteners 13 also secures a lubricating nipple 14 to the backing plate 12 for supply of lubricant via a feed duct (not shown).

Lubricant supplied by the nipple 14 flows via the lubricant ducts 11 and throughbores 15 of the inner retainer plate 8 and channels 16 of the deflection member 3 to the rolling elements 4. A sealing ring 17 realizes a sealing of the throughbore 15 and the channel 16 between the inner retainer plate 8 and the deflection member 3 and surrounds a projection of the deflection member 3, accommodating the channel 16.

Turning again to FIG. 3, it can be seen that the load-bearing track 18 and the return track 19 are bounded by a continuous coating 20 which surrounds the metallic material of the main body 1 and is made of polymer material. The coating 20 has radial guide surfaces 21, 22 as well as axial guide surfaces for the rolling elements 4, and has formed therein lubricant ducts 23, 24 in the form of grooves which are open toward the rolling elements 4. The lubricant ducts 23, 24 are located in the return track 19 of the main body 1 and in the arcuate passageway of the deflection member 3 for the rolling elements 4, suitably formed in the arcuate pathway of the deflection member 3.

The coating 20 is applied on the main body 1 not only along the return track 19 but also along the load-bearing track 18, whereby in the area of the load-bearing track 18, the coating 20 is provided in the form of guide webs for the rolling elements 4. In the non-limiting example shown in the drawing, the guide webs for the rolling-element circuits include an upper web 26, a central web 27 and a lower web 28. In the respective arcuate deflection zone, the upper web 26 is connected with the portion of the coating 20 located in the upper return track 19 via a deflection member 29, and the lower web 28 is connected with the portion of the coating 20 located in the lower return track 19 via a deflection member 29. The deflection members 29 surround the main body 1 within the respective arcuate deflection zone. In this way, the central web 27 is connected with the portions of the coating 20 in both superimposed return tracks 19, as shown on the right hand side in FIG. 4.

Figure 5:
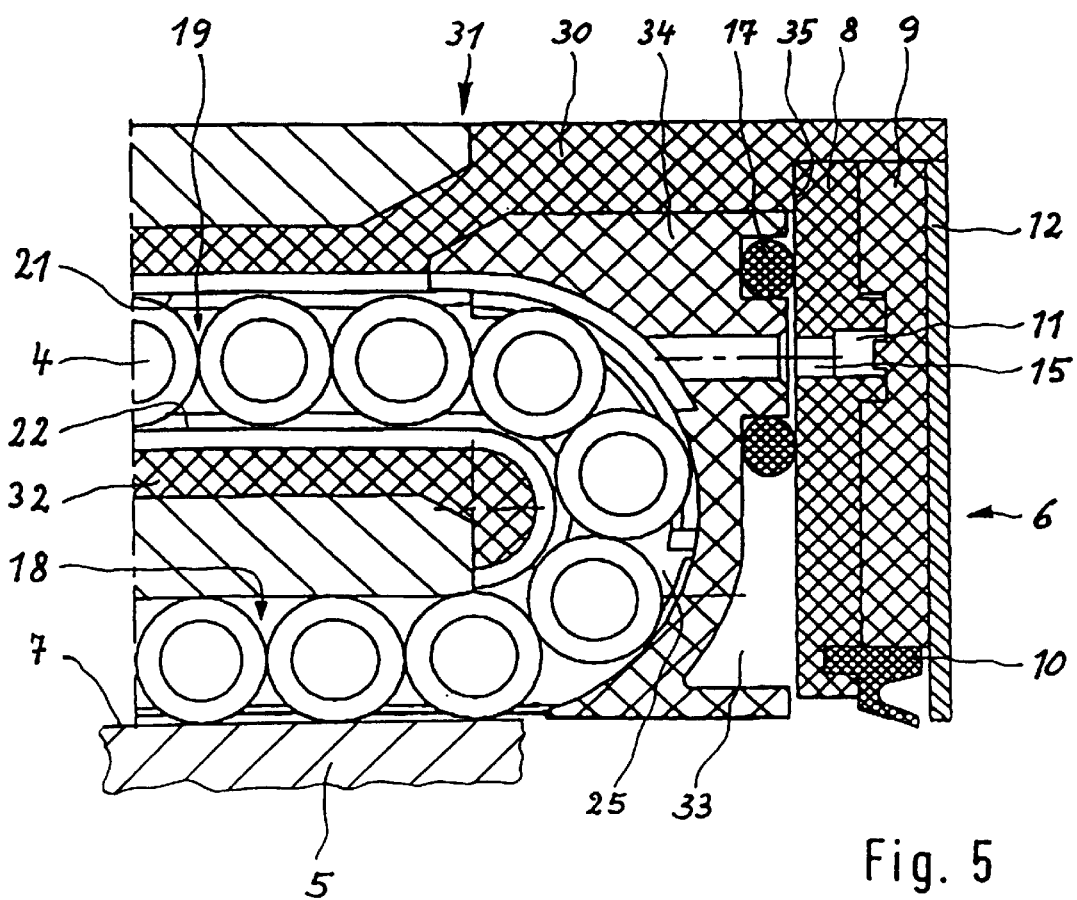
FIG. 5 is a partially sectional end view of another bearing element according to the present invention.

Turning now to FIG. 5, there is shown a partially sectional end view of another bearing element according to the present invention. Parts corresponding with those in FIGS. 1 to 4 are denoted by identical reference numerals and not explained again. The bearing element of FIG. 5 differs from the embodiment of FIGS. 1 to 4 in that a main body 31 is formed on each of its opposite ends with an extension piece 30 made of polymer material. The extension piece 30 is formed integrally with a coating 32 in the load-bearing track 18 and the return track 19. The extension piece 30 is made of the same polymer material as a deflection member 34 defining an arcuate passageway 25. Each extension piece 30 defines a bay 33 for the deflection member 34. The wiper 6, including the inner and outer retainer plates 8, 9, the sealing strip 10 and the backing plate 12, is received completely in the bay 33 and secured to the main body 31 by screw fasteners (not shown), whereby the inner retainer plate 8 is supported by a shoulder 35 which is formed inside the bay 33 on the extension piece 30.

While the invention has been illustrated and described as embodied in a linear rolling bearing element, it is not intended to be limited to the details shown since various modifications and structural changes may be made without departing in any way from the spirit of the present invention.

What is claimed as new and desired to be protected by Letters Patent is set forth in the appended claims.

What is claimed is:

1. A linear rolling bearing element mounted to a running surface of a guide rail, comprising:

a main body which includes a rolling-element circuit for guiding the main body along a guide rail via a plurality of rolling elements, said rolling-element circuit having a load-bearing track and a return track, said main body having opposite ends, each end having formed therein a bay which is accessible through an adjacent end face of the main body;

two deflection members, one of the deflection members completely and detachably received in the bay at one end of the main body and the other one of the deflection members completely and detachably received in the bay at the other end of the main body, each deflection member having formed therein an arcuate passageway for interconnecting the load-bearing track and the return track; and guide means, disposed in the load-bearing track and the return track and made of a polymer material, for guiding the rolling elements, said guide means including a coating applied through an injection-molding process in a single working step in the load-bearing track and the return track, wherein the guide means includes an extension piece disposed at the end of the main body and formed integrally with the coating for circumscribing the bay.

2. The linear rolling bearing element of claim 1, and further comprising a wiper directly resting against the main body for sealing the adjacent bay to the outside.

3. The linear rolling bearing element of claim 2 wherein the wiper includes an inner retainer plate, an outer retainer plate, a sealing strip, a backing plate, and screw fasteners for securing the inner retainer plate, the outer retainer plate, the sealing strip and the backing plate to the main body, with the inner plate being positioned immediately adjacent to the main body.

4. The linear rolling bearing element of claim 1, and further comprising a wiper disposed in the bay for sealing the bay to the outside.

5. The linear rolling bearing element of claim 4 wherein the wiper includes an inner retainer plate, an outer retainer plate, a sealing strip, a backing plate, and screw fasteners for securing the inner retainer plate, the outer retainer plate, the sealing strip and the backing plate to the main body, with the inner plate being supported by a shoulder of the extension piece.

* * * * *